Oct. 11, 1960

W. E. STEEN 2,955,479

GEAR SHIFTING MECHANISM

Filed July 23, 1958

INVENTOR.
WILLIAM E. STEEN
BY
Andrus + Starke
Attorneys

INVENTOR.
WILLIAM E. STEEN

Oct. 11, 1960 W. E. STEEN 2,955,479
GEAR SHIFTING MECHANISM
Filed July 23, 1958 3 Sheets-Sheet 3
FIG. 4.
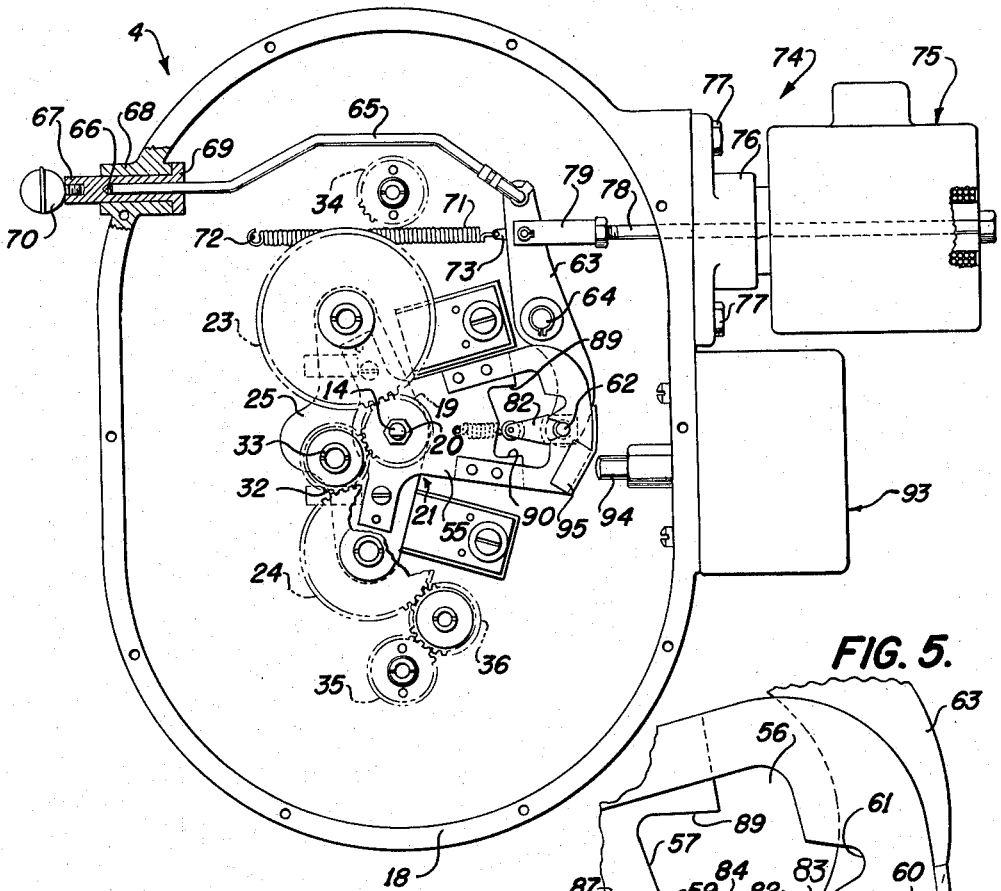
FIG. 5.
FIG. 6.
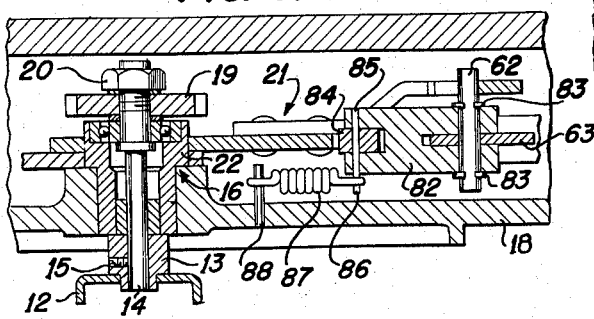
INVENTOR.
WILLIAM E. STEEN
BY
Attorneys United States Patent Office 2,955,479
Patented Oct. 11, 1960

2,955,479
GEAR SHIFTING MECHANISM

William E. Steen, South Pasadena, Calif., assignor to A. O. Smith Corporation, Milwaukee, Wis., a corporation of New York Filed July 23, 1958, Ser. No. 750,353

14 Claims. (Cl. 74—354)

This invention relates to a gear shifting mechanism and particularly to a gear shifting mechanism for changing the operative connection of a fluid flow meter from one counting register to another without discontinuing the fluid flow through the meter.

In transporting fluid products such as kerosene, fuel oil, gasoline and the like, a single pipe line is often employed between a main distributing source and a distant storage or pumping station with the products successively flowing through the pipe line therebetween.

A suitable means to check the specific gravity or the like of the product flowing through the pipe line is employed to determine when a change occurs in the product being received at the pumping station. Suitable line valves provided at the pumping station are actuated to direct the flow of the different fluids into corresponding lines or storage tanks.

The fluid flowing through the pipe line at the pumping station drives a suitable fluid flow meter to provide a mechanical movement or the like in proportion to the amount of fluid received at the pumping station. To record the different incoming fluids, a pair of counting units are employed and geared to the meter by a gear arrangement permitting connection of the meter from one to the other counting unit as the change of product occurs, all without disconnecting or shutting down any of the components. Simultaneously with the switching of the meter to the counting units, the line valves are opened and closed to direct the flow of fluid into a corresponding line or tank.

The counting units may also include means to print a ticket and record the amount of a particular product received. A ticket is inserted into the printing portion prior to the shifting operation. After the shifting operation the disconnected counting unit is operated to register the recorded amount upon the ticket previously placed therein and to simultaneously reset the counter to zero. The ticket is removed and replaced with a new blank ticket.

It is important that a positive gear shifting is smoothly and reliably accomplished in switching from one counting unit to the other. Positive holding means must also be provided to releasably lock the gear mechanism in the shifted position.

The present invention provides an automatic gear shifting mechanism which is adapted to be locally or remotely manually controlled and which includes a simple interlock to hold the gear mechanism in operative connection with either of a pair of counters. The gear shifting is accomplished by pivotal movement of a gear support carrying a pair of spaced gears simultaneously driven from a fluid flow meter and adapted to be selectively engaged with individual input gears to the respective counting units. Suitable idling gears are provided to establish a gear arrangement whereby the engaging teeth of the engaging gears are moving in the same direction as the gear-carrying plate. This gear arrangement establishes a smooth and positive engaging structure.

In accordance with another aspect of the invention, the gear support is provided with spaced locking and positioning surfaces and a selectively positionable control assembly is biased to engage the locking surface and to thereby hold the gear support in one of two alternate positions. To shift the connection of the gear mechanism from one counting unit to the other, the control assembly is disengaged from a locking position and in so moving engages the positioning surface to operatively pivot the gear support to connect the fluid flow meter to the second counting unit. Subsequent similar actuation of the control assembly pivots the gear support to the original position and changes the connection of the fluid flow meter to the original counting unit.

The drawings furnished herewith illustrate the best mode presently contemplated by the inventor for carrying out the invention.

In the drawings:

Fig. 4 is a view taken on line 4—4 of Fig. 3;

Fig. 5 is a fragmentary perspective view of the gear actuating mechanism; and

Fig. 6 is a fragmentary view of the gear shifting mechanism.

Figure 1:
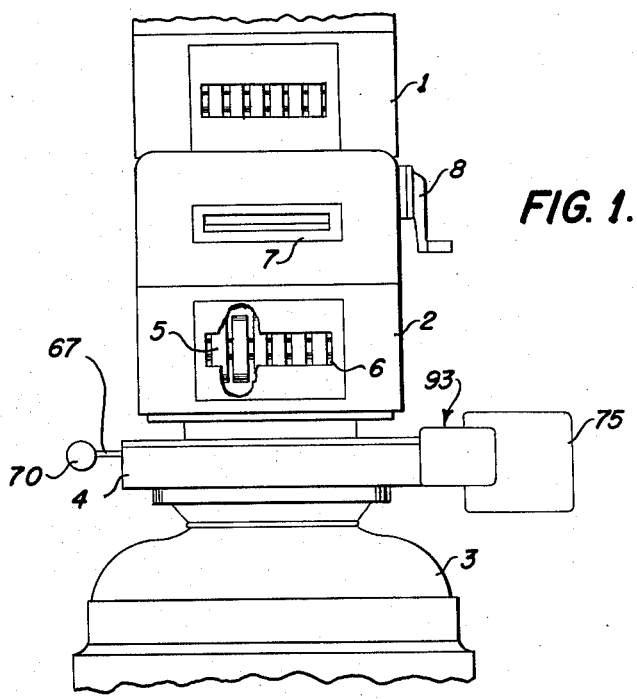
Figure 1 is a front elevational view of a pair of counting units mounted on a fluid flow meter.
Figure 2:
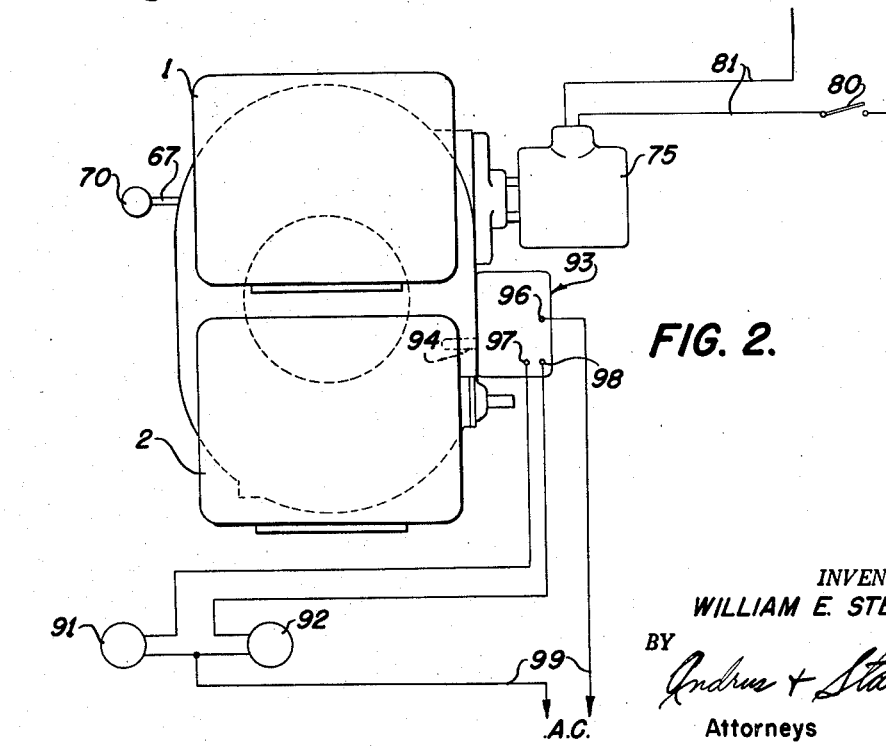
Fig. 2 is a top elevational view of the apparatus shown in Figure 1.

Referring particularly to Figs. 1 and 2 of the drawings, a pair of counting units 1 and 2 are arranged in side-by-side and vertically-spaced relation and connected to the mechanical output of a meter 3. A shifting mechanism 4 is interposed between the meter 3 and the counting units 1 and 2 to allow selective connection of the meter to either of the counting units.

The counting units 1 and 2 are similarly suitably constructed registering devices. The unit 1 is selected for description.

The counting and printing unit 1 includes a plurality of digit establishing wheels 5 operably associated with the meter 3 through the shifting mechanism 4 and adapted to be driven in accordance with fluid flow through the meter to record the amount of fluid which has passed through the meter 3. A window 6 is provided through which appears a single row of horizontally aligned digits on the wheels 5 illustrating the amount of fluid which has been withdrawn. A ticket 7 upon which the amount of fluid passing through meter 3 is to be recorded is inserted within the unit 1 through a suitable slot or opening. A pair of reset handles 8 are connected to the counting mechanism and to the printing mechanism and upon suitable actuation thereof return the wheels 5 to a zero reading and simultaneously record the latest withdrawal registered by the corresponding unit on the inserted ticket 7.

The fluid flow meter 3 is a device which responds to the fluid flowing through the pipe line and establishes a mechanical output in proportion thereto. For example, United States Patent 2,362,778, which issued November 14, 1944, to W. E. Steen discloses a volume measuring fluid flow meter including a rotor mechanism, not shown, disposed within a measuring chamber to measure the volume of fluid passing through the chamber and to drive a shaft 9, partially shown in Figure 3, in proportion to the fluid flowing therethrough.

The output shaft 9 of the meter 3 is connected to the gear shifting mechanism 4 in the illustrated embodiment of the invention by a suitable coupling, such as follows.

A disc-like clutch member 10 constituting the driven member of the clutch, and having a pair of spaced openings 11 in the upper surface thereof is secured to the upper end of shaft 9. The other part of the clutch is an inverted U-shaped rod member 12 with the lower arms of the member disposed within the openings 11. The member 12 is centrally secured to a hub 13 which is rigidly locked to a drive shaft 14 of the gear shifting apparatus 4 by a setscrew 15. The drive shaft 14 is journalled within a combined radial and thrust bearing unit 16 secured within a central bearing hub 17 in the lower wall of a housing 18 for the gear shifting apparatus 4.

A main drive gear 19 is secured to the inner end of shaft 14 by a suitable hex nut 20 which threads onto a threaded end of the shaft and clamps the drive gear 19 between the nut 20 and the upper surface of the combined radial and thrust bearing 16.

A gear plate 21 is pivotally secured about a circular portion 22 of the bearing unit 16 and rests upon the upper surface of the hub 17. As shown in Figure 4, the plate 21 is generally T-shaped and carries relatively large shifting gears 23 and 24 on the opposite ends of a cross member 25 thereof. Each gear 23 and 24 is suitably secured to the cross member 25 in vertically spaced relation thereto, as follows.

Figure 3:
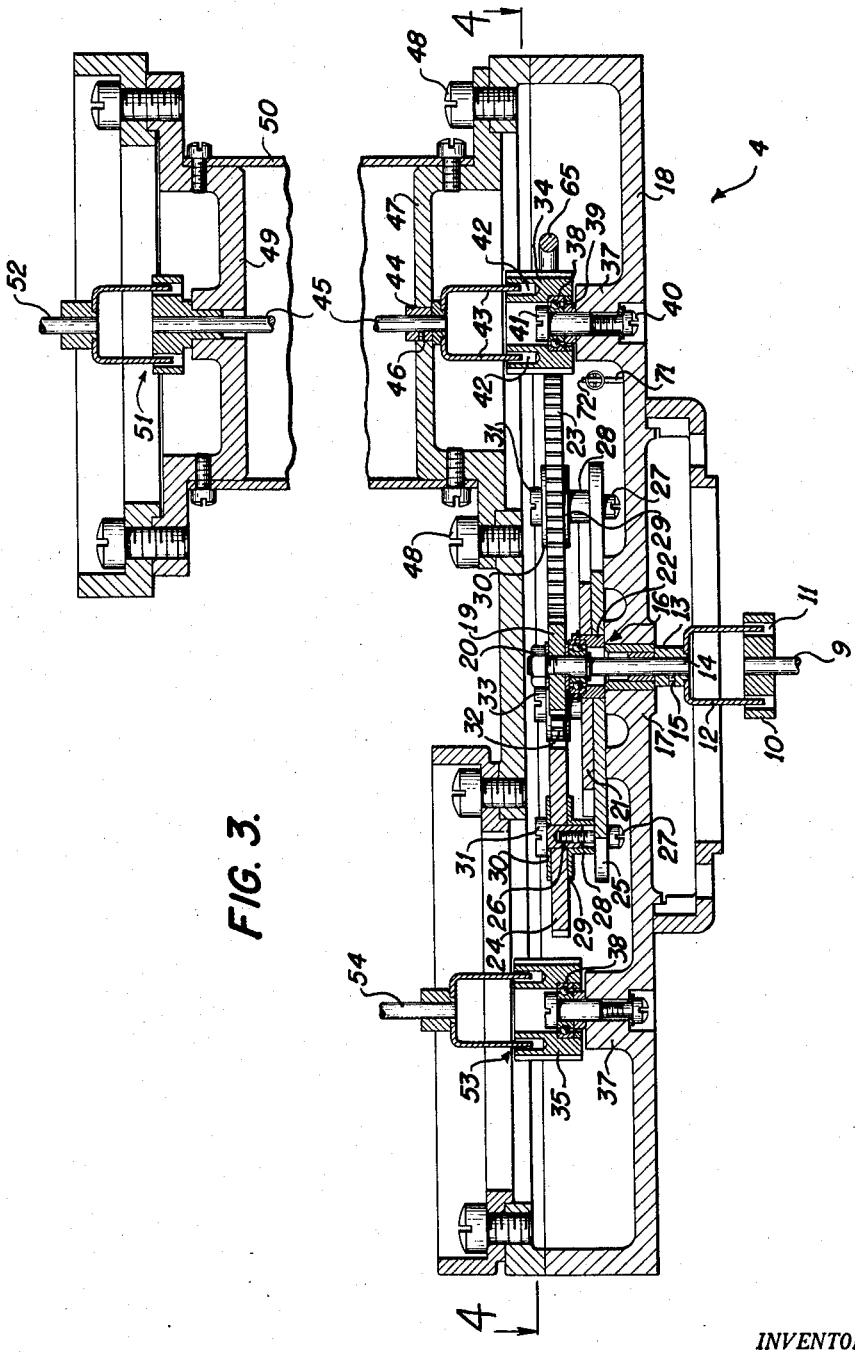
Fig. 3 is a vertical section through the shifting mechanism shown in elevation in Figs. 1 and 2.

Referring to Fig. 3, flanged shafts 26 respectively pass through gear 23 and gear 24 and each is secured to the upper surface of the cross member 25 of gear plate 21 by a cooperating cap screw 27 which extends through the plate and threads into the corresponding tapped opening in the lower portion of the shaft 26. A flanged hub 28 encircles the shaft 26 between the cross member 25 and the corresponding gears 23 and 24 with the gears resting on the flange 29 of the hub 28. A washer 30 is disposed between the head 31 of shaft 26 and the upper surface of the corresponding gears 23 and 24 and when the cap screw 27 is drawn up, the corresponding gears 23 and 24 are securely clamped between the flange 29 and washer 30 and thereby to the gear plate cross member 25.

Referring particularly to Fig. 4 of the drawings, the shift gear 23 is driven directly by the main drive gear 19 while the shift gear 24 is somewhat smaller than the gear 23 and is driven by the main drive gear 19 through an idler gear 32.

A supporting attachment 33 similar to that illustrated for gears 23 and 24 is provided for the gear 32.

The output gears 34 and 35 of the gear shifting apparatus 4 are mounted on opposite sides of the gear plate cross-member 25 adjacent to the gears 23 and 24. The output gear 34 is disposed in the path described by gear 23 incident to pivoting of gear plate 21 to allow selective engagement and disengagement of the gears. An idler gear 36 is stationarily supported in constant mesh with the output gear 35 and in the path described by gear 24 incident to pivoting of gear plate 21. By selectively positioning the gear plate 21, the gear 23 is engaged with output gear 34 to drive the same or gear 24 is engaged with the idler gear 36 to drive the gear 35.

Referring again to Fig. 3, the output gears 34 and 35 and idler gear 36 are similarly mounted on suitably positioned casing hubs 37 of housing 18 as follows, gear 34 being specially referred to for purposes of description.

A ball bearing 38 is pressed within an enlarged recess in the lower portion of gear 34. The lower portion of the inner race member 39 of the ball bearing 38 acts as a thrust element resting upon the upper surface of the corresponding hub 37 formed in the lower casing wall. The gear 34 is apertured and a cooperating capscrew 40 and tapped bolt-shaft 41 pass through the bearing 38 and respectively engage the upper surface of bearing 38 and the lower surface of hub 37 to securely mount the gear 34 upon the hub 37. The gear 34 is thus supported free to rotate about the inner race member 39.

The gears 35 and 36 are similarly mounted on corresponding hubs 37 to correctly locate the gears.

The output gear 34 is coupled to drive the counting unit by a pair of recesses 42 in the upper surface of gear 34 and correspondingly positioned coupling prongs 43. A centrally located hub 44 is rigidly attached to the base connection of prongs 43 and to a vertically extending shaft 45 by a setscrew 46. The shaft 45 is journalled at the lower end within a lower housing cover 47 secured to the gear housing 18 by a plurality of cap screws 48 and at the upper end to a counter support 49 secured in suitable spaced relation to the lower cover 47 by a tubular housing 50. A pronged coupling 51, similar to that joining gear 34 to shaft 45, joins the upper end of shaft 45 to an operating shaft 52 for driving the registering wheels 5 of counter 1. Therefore, if the gear plate 21 is pivoted to effect engagement of gear 23 and gear 34, the counting unit 1 is driven to register the fluid which flows through the meter 3.

When it is desired to register fluid flow on the counting unit 2, the plate 21 is pivoted to engage gear 24 with idler gear 36 and thus drive the output gear 35 in proportion to the fluid flowing through the meter. A pronged coupling 53, similar to the previously described pronged couplings, join the gear 35 to an operating shaft 54 for driving the registering wheels 5 of counting unit 2.

Thus, by selectively positioning the plate 21 either counting unit 1 or counting unit 2 is driven in accordance with the fluid flow through the meter 3.

The counting units 1 and 2 are generally similar in construction and the output gears 34 and 35 which are adapted to drive the corresponding operative shafts, are therefore adapted to rotate in the same relative direction, shown for purposes of illustration as a counterclockwise direction as viewed in Figure 4. The gear arrangement shown is such that with a counterclockwise rotation of the meter-driven gear 19, the respective mating teeth of mating gears 23 and 34 and gears 24 and 36 travel in the same relative direction as the movement of the plate 21 to effect the respective engagement of the gears.

Thus, in Fig. 4 when plate 21 is pivoted to engage gear 23 and gear 34, the plate 21 rotates in a clockwise direction. Gear 23 also rotates in a clockwise direction and while gear 34 rotates about its own axis in a counterclockwise direction, with respect to the movement of platae 21, the peripheral mating teeth of gear 34 also move in the same relative direction as the teeth of gear 23 and plate 21, that is, clockwise about the main drive gear 19.

To operably engage gear 24 to gear 35, the idler gear 36 is interposed. The interposed idler gear 36 reverses the effective direction of rotation of the gear 24 to the necessary counterclockwise direction assumed necessary for similar counters 1 and 2.

The movement of the gear shifting mechanism to operatively disconnect one counter and operatively connect the other establishes a smooth and positive gear engagement.

The required pivotal movement of the gear plate 21 is obtained in the following manner. Referring to Figs. 4 and 5, the center leg 55 of the T-shaped gear plate 21 extends radially from the hub 17 and is provided with a cam opening 56 at the outer end. Adjacent cam surfaces 57 and 58 converge in the opening 56 to establish an apex 59 pointing radially outwardly of the pivotal connection of plate 21. A pair of spaced notches 60 and 61 are provided in the opening 56 opposite to the cam surfaces 57 and 57 with the notch 60 on one side of the apex 59 and the notch 61 on the opposite side of the apex 59.

A locking pin 62 is selectively disposed within one of the notches 60 and 61 to rigidly hold the plate 21 in either one of the two alternate positions. The locking pin 62 is secured to the outer end of a lever arm 63 which is centrally pivotally supported as at 64 upon a hub, not shown, of the housing 18 such as by a pivotal support similar to the hub attachment for gears 34, 35 and 36.

A manual operating rod 65 is pivotally secured to the opposite end of the lever arm 63 and extends laterally therefrom into an opening 66 in the end of an actuating sleeve 67 which is journaled for longitudinal movement through a bearing 68 in the casing wall. A collar 69 is integrally formed on the inner end of the sleeve 67 and engages the inner end of the bearing 68 to prevent complete withdrawal of actuating sleeve 67. A knob 70 is secured to the outer end of the sleeve 67 to provide convenient grasping of the sleeve 67 and to prevent movement of the sleeve completely into the casing.

A spring 71 is secured to a stationary pin 72 and to a hook 73 on the lever arm 63 to bias the lever arm in a direction to dispose the pin 62 within an aligned notch 60 or 61 and the operating rod 65 and sleeve 67 outwardly to a normal standby position. To actuate the lever arm 63, the sleeve 67 is pushed inwardly which movement is transmitted to rod 65 and thus to lever arm 63 through engagement between the base of opening 66 and the end of rod 65.

The operating rod 65 is freely slidable within sleeve opening 66 and can move with lever arm 63 independently of the sleeve 67 under the action of a solenoid control mechanism 74. The independent control is provided because the sleeve 67 may freeze or stick within the bearing 68. For example, in northern areas of the United States, water may enter the bearing 68 between the casing and the sleeve 67 and freeze preventing movement of sleeve 67. The shifting rod 65, however, remains free to move and the lever arm 63 may be actuated by the solenoid control mechanism 74.

The solenoid control mechanism 74 also permits remote control of the shifting mechanism and includes a solenoid 75 which is secured to the outer surface of the gear casing 18 through a portion of the solenoid frame 76 and a plurality of bolts 77. The armature 78 of the solenoid 75 extends into the casing 18 and terminates in a pivotal connection 79 to the lever arm 63.

Referring to Fig. 2, a switch 80 is connected in series with the solenoid 75 to a suitable source of current, not shown, by leads 81. When the switch 80 is closed, the circuit to solenoid 75 is completed and the armature 78 overcomes the force of spring 71 and is retracted. The lever arm 63 is thereby moved in a manner similar to manual operation of the control rod 65.

Either of the above-described manually controlled movements of the locking pin 62 simultaneously establishes movement of a cam member 82 towards the cam surfaces 57 and 58.

Referring to Figs. 4 and 6, cam member 82 is bifurcated at its opposite ends with one end pivotally secured to the locking pin 62 by a pair of spaced lock-washers 83 which encircle the pin 62 and contract into suitable recesses or annular grooves in the pin 62. A cam roller 84 is journalled between the arms of the opposite bifurcated end of member 82 on a shaft 85 which is secured to the corresponding arms and which extend downwardly from the cam member 82 as at 86. A spring 97 is secured at one end to this lower shaft extension 86 and to a stationary pin 88 at the opposite end. The pin 88 is embedded within the wall of the casing or otherwise suitably secured in a stationary position on the center line passing through the pin 62 and the gear 19.

Depending upon which of the notches 60 and 61 the pin 62 engages, the cam roller 84 is disposed in alignment with the correspondingly aligned cam surface 57 or 58. When the pin 62 moves out of engagement with the notch 60 or 61, the roller 84 tends to move in a corresponding direction. However, the roller 84 engages the then aligned cam surface 57 or 58 and pivots the cam member 82 about the pin 62 with the roller 84 traveling down the engaged cam surface 57 or 58. The cam surfaces 57 and 58 merge with radially extending stop wall portions 89 and 90, respectively. When the cam roller 84 engages a stop wall portion 89 or 90, further movement of cam member 82 under the action or movement of lever arm 63 and pin 62 acts to pivot the gear plate 21 and thereby reverse the effective operative engagement of gears 23 and 24.

Referring to Fig. 4, the pin 62 is disposed within notch 60 and rigidly holds the plate 21 with gear 24 engaging idler gear 36 to effect operation of the counting unit 1. The spring 87 holds the cam member 82 on a radial line between gear 19 and locking pin 62 and consequently holds cam roller 84 in alignment with cam surface 58 to the corresponding side of apex 59.

To change the operative connection of fluid flow meter 3 to counting unit 2, lever arm 63 is pivoted, clockwise in Fig. 4, by suitable actuation of control rod 65 or energization of solenoid 75.

The pin 62 moves out of engagement with notch 60 and thus frees the plate 21 for pivotal movement.

Simultaneously, the cam roller 84 moves in a radial direction and engages cam surface 58. The continued movement of lever arm 63 biases the cam member 82 and cam roller 84 past the cam surface 58 and the cam member 82 pivots about pin 62. The cam roller 84 engages the adjacent integral stop wall 90 prior to complete pivotal movement of lever arm 63. During the final movement of lever arm 63, the cam member 82 continues to pivot about pin 62 and pushes on the stop wall 90 through the cam roller 84 to pivot the plate 21 in a clockwise direction.

As the plate 21 pivots, gear 24 disengages idler gear 36 to discontinue operation of the counting unit 1 and gear 23 engages gear 34 to begin operation of the counting unit 2.

The pivoting of plate 21 also moves notches 60 and 61 in a counterclockwise direction and disposes notch 61 in alignment with the path of pin 62. When the rod 65 is released or solenoid 75 de-energized, the spring 71 returns lever arm 63 to its original position. The locking pin 62 then registers with notch 61 and securely holds plate 21 with gear 23 in engagement with gear 34 to operate counting unit 2.

The pivoting of plate 21 further moves the apex 59 of cam surfaces 57 and 58 to align the locking pin 62 and cam member 82 with the cam surface 57. Subsequent similar actuation of lever arm 63 effects movement of the cam roller 84 into engagement with the cam surface 57 and then stop wall 89 to establish reverse pivoting of plate 21 and registration of pin 62 and notch 60 to hold gear 24 in engagement with gear 36, as shown in Fig. 4.

To visually illustrate or indicate which of the counting units 1 or 2 is in operation, a pair of parallel-connected lights 91 and 92 are associated with the counting units 1 anl 2, respectively, and are lit whenever the corresponding counter is being driven. Referring to Figures 2 and 4, a single-pole double-throw switch 93 includes a switch button 94 which is disposed in the pivoting path of a switch actuator 95 secured to the extending leg of plate 21. The switch button 94 constitutes a part of a switch armature, not shown, which is adapted to selectively connect a common contact 96 of switch 93 to either a contact 97 which is connected in circuit to light 91 or a contact 98 which is connected in circuit to the light 92. The contact 96 and the opposite sides of the lights 91 and 92 are connected to incoming power leads 99. When the plate 21 is in a position to engage gear 23 and gear 34 to drive counting unit 2, the actuator 95 disengages switch button 94 which is biased by suitable means, not shown, to effect engagement between contact 97 and contact 96 and thereby illuminate light 91. When the plate 21 is pivoted to effect engagement of gear 24 and gear 36 to drive counting unit 2, the actuator 95 engages switch button 94 and moves button 94 against the bias force to effect engagement between the common contact 96 and contact 98 to thereby illuminate light 92 and indicate the operative connection to the counter 2.

The present invention provides a simple and reliable gear shifting mechanism for engaging and disengaging gear trains having a common input gear without discontinuing operation or movement of the input gear.

Various modes of carrying out the invention are contemplated as being within the scope of the following claims particularly pointing out and distinctly claiming the subject matter which is regarded as the invention.

I claim:

1. In a gear shifting mechanism, a main drive gear, a pair of spaced output gears, a gear support pivotally mounted adjacent the main drive gear and said output gears, means adapted to position said gear support in alternate positions, a first gear system secured to the gear support in constant mesh with said main drive gear and adapted to mesh with one of said output gears with the gear support in one of said alternate positions, a second gear system secured to the gear support in constant mesh with said main drive gear and adapted to mesh with the other of said output gears with the gear support in the second of said alternate positions, each of said gear systems being arranged to effect engagement between the output gear and the pivoting gear with the engaging peripheries of the engageable gears moving in the direction the gear support is pivoted to effect engagement therebetween, a control arm secured to said gear support and extending radially therefrom, said control arm having a pair of circumferentially spaced and radially extending notches, a locking pin selectively positionable radially of said notches and adapted to lock said support in alternate position when disposed within said notches, a cam biased to a predetermined home position relative to said locking pin and pivotally interconnected to said locking pin for simultaneous movement therewith, and a pair of angularly arranged cam surfaces in said gear support and arranged to alternately align with said cam as said locking pin engages alternate notches, said cam surfaces being disposed in the path of said cam and extending circumferentially of said cam in the direction the gear support next pivots and including a stop wall portion adjacent the extended end of the corresponding cam surface whereby said cam moves along the then aligned cam surface and into engagement with the corresponding stop wall and pivots the gear support incident to predetermined movement of said locking pin from an aligned notch to align the opposite notch with said locking pin and the opposite cam surface with the home position of said cam.

2. In a gear shifting mechanism, a main drive gear, a pair of spaced output gears, a gear support pivotally mounted adjacent the main drive gear and said output gears, means adapted to position said gear support in alternate positions, a first gear system secured to the gear support meshing with said main drive gear and adapted to mesh with one of said output gears with the gear support in one of said alternate positions, and a second gear system secured to the gear support meshing with said main drive gear and adapted to mesh with the other of said output gears with the gear support in the second of said alternate positions, each of said gear systems being arranged to effect engagement between the output gear and the pivoting gear with the engaging peripheries of the latter ears generally moving in the direction the gear support is pivoted to effect such engagement.

3. In a gear shifting mechanism, a main drive gear, a pair of spaced output gears rotatably mounted on opposite sides of the main drive gear, a gear support pivotally mounted adjacent the main drive gear and intermediately of said output gears, lock means adapted to alternately position said gear support in a first position and in a second position, a first gear system secured to the gear support in constant mesh with said main drive gear and adapted to operatively engage one of said output gears with the gear support in said first position, and a second gear system secured to the gear support in constant mesh with said main drive gear and adapted to operatively engage the other of said output gears with the gear support in said second position, each of said gear systems being arranged to effect engagement between the output gear and the pivoting gear with the engaging peripheries of the latter gears moving in the same direction relative to the gear support pivot as the gear support is pivoted.

4. In a gear shifting mechanism to selectively connect a common drive gear to either of a pair of radially and circumferentially spaced output gears adapted to rotate in the same relative direction, a gear plate pivotally mounted about said common drive gear, an intermediate gear rotatably mounted upon said gear plate and adapted to mesh with one of said output gears incident to pivotal movement of said gear plate corresponding to the peripheral motion of the engaging teeth relative to the axis of said drive gear, a second intermediate gear pivotally mounted on said gear plate in spaced relation to said common drive gear, an idler gear rotatably mounted on said gear plate and intermeshing with both said common drive gear and said second intermediate gear, and a second idler gear rotatably mounted in intermeshing relation with the other of said output gears and adapted to intermesh with said second intermediate gear incident to opposite pivotal movement of said gear plate.

5. A gear system adapted to selectively couple a rotating member to either one of a pair of output devices, which comprises a pivotal gear support, a first gear system including output gear means connected to a first of said output devices and movable gears mounted on said gear support and engaging said output gear means incident to rotation of the gear support toward the first output device, said output gear means and movable gears being arranged to effect meshing of the output gear means and movable gears with the engaging peripheries of the engaging gears moving generally in the direction of the pivotal movement of the gear support, and a second gear system including output gear means connected to the second of said output devices and movable gears mounted on said gear support and intermeshing with said second named output gear means incident to rotation of the gear support toward the second output device, said output gear means and movable gears of said second gear system being arranged to effect engagement between the output gear means and the movable gear of the second gear system with the engaging peripheries of the engaging gears moving generally in the direction the gear support is pivoted.

6. A gear system adapted to selectively couple a rotating member to either one of a pair of output devices, which comprises a main drive gear, a shaft for said main drive gear, a base having a hub with said shaft journaled therein, a gear plate journaled on said shaft and resting on said hub, means to lock said gear plate in closely angularly spaced alternate positions, a first output gear rotatably supported on said base adjacent one end of the cross portion of the T-shaped gear plate and adapted to rotate in the same direction as said main drive gear, a second output gear rotatably supported on said base adjacent the opposite end of the cross portion of the T-shaped gear plate and adapted to rotate in the same direction as said main drive gear, an intermediate gear rotatably mounted on said first-named end of the cross portion of the gear plate in constant mesh with said main drive gear and adapted to mesh with said first output gear incident to clockwise positioning of the gear plate, a second intermediate gear rotatably secured to the opposite end of the cross portion in spaced relation to said main drive gear and said second output gear, a first idler gear rotatably mounted on said gear plate in constant mesh with said main drive gear and said second intermediate gear, and a second idler gear rotatably mounted on said base in constant mesh with said second output gear and in the path of said second intermediate gear to effect intermeshing thereof incident to counterclockwise positioning of said gear plate.

7. A gear shifting mechanism, comprising a pivotal gear support having a pair of circumferentially spaced notches, a locking pin selectively positionable radially of said notches and adapted to lock said support in alternate position when disposed within said notches, a positioning lever carrying said locking pin and pivotally mounted for positioning said locking pin, an actuating means including a pair of telescoped rod members, one of said rod members being secured to said lever and the other of said rod members being journaled within the casing for the gear shifting mechanism, said last named means including stop means to prevent complete withdrawal of said last named means from the casing, biasing means operably connected to said positioning lever to bias said lever to a locking position and said actuating means outwardly of said casing, totally enclosed control means operatively coupled to said positioning lever to move the lever independently of said first named actuating means, a cam biased to a predetermined position relative to said locking pin and pivotally interconnected to said locking pin for simultaneous movement therewith, and a pair of angularly arranged cam surfaces in said gear support and arranged to alternately align with said cam as said locking pin engages alternate notches, said cam surfaces being disposed in the path of said cam and extending circumferentially of said cam in the direction the gear support next pivots and terminating in a stop wall portion whereby said cam moves along the then aligned cam surface and into engagement with the corresponding stop wall and pivots the gear support incident to predetermined movement of said locking pin.

8. A gear shifting mechanism, comprising a gear base, a gear support adapted to be pivotally mounted on said gear base and having a radial control arm, an opening in said radial control arm having a pair of circumferentially closely spaced notches in the outer edge of the opening, a locking pin adapted to be moved in a predetermined generally radial path adjacent said notches, means to selectively position said locking pin, the edge of said opening opposite said notches including a pair of diverging cam surfaces terminating in a stop means and forming an outwardly projecting apex lying on a line extending between the pivot axis of the gear support and centrally between said notches, a cam pivotally secured to said locking pin and disposed within said opening, and resilient means extending radially of the pivot axis of said gear support, said resilient means being secured to said cam and to said gear base to bias said cam in a radial direction toward said diverging cam surfaces whereby said cam moves along a diverging cam surface into operative engagement with a stop means to pivot the gear support incident to predetermined movement of said locking pin.

9. In a gear shifting mechanism adapted to selectively connect a main drive gear to either of a pair of spaced output gears, a gear base, a gear support adapted to be pivotally mounted on said gear base and having a radial control arm, an opening in said radial control arm having a pair of circumferentially closely spaced notches in the outer edge of the opening, a locking pin adapted to engage said notches and rigidly hold said gear support from pivotal movement, manually controlled lever means connected to said locking pin and extending generally laterally of said control arm, a pivot support for said lever means to establish radial movement of said locking pin with respect to said notches, the opposite edge of said opening including a pair of diverging cam surfaces terminating in a stop means and forming an outwardly projecting apex lying on a line extending between the pivot axis of the gear support and centrally between said notches, a cam pivotally secured to said locking pin and disposed within said opening, and resilient means extending radially of said pivot axis and being secured to said cam and to said gear base to bias said cam in a radial direction toward the aligned diverging cam surface whereby said cam moves along the aligned diverging cam surface into operative engagement with a stop means to pivot the gear support incident to predetermined movement of said locking pin.

10. In a gear shifting mechanism adapted to selectively connect a main drive gear to either of a pair of spaced output gears, a gear base, a gear support adapted to be pivotally mounted on said gear base and having a radial control arm, an opening in said radial control arm having a pair of circumferentially closely spaced notches in the outer edge of the opening, a locking pin adapted to engage said notches and rigidly hold said gear support from pivotal movement, manually controlled lever means connected to said locking pin and extending generally laterally of said control arm, a pivot support for said lever means to establish radial movement of said locking pin with respect to said notches, the opposite edge of said opening including a pair of diverging cam surfaces terminating in a stop wall and forming an outwardly projecting apex lying on a line extending between the pivot axis of the gear support and centrally between said notches, a rigid cam disposed with the opening and pivotally secured to said locking pin, said cam having a cam roller journaled on transversely extending shaft in spaced relation to said locking pin and adjacent the opposite edge of the opening, and a coil spring secured at one end to said transversely extending shaft and at the opposite end to said gear base to bias the cam roller on a radial line extended between the pivotally mounting of said gear support and said locking pin whereby said cam roller alternately engages and moves along said diverging cam surfaces into operative engagement with the corresponding stop wall to pivot the gear support incident to successive actuations of said locking pin.

11. A gear shifting control in a gear mechanism having an enclosing casing, which includes a manual control member extending through the wall of said casing, a mechanical connecting means coupling the gear mechanism and said manual control member to shift said gear mechanism incident to predetermined movement of said control member from a stand-by position relative to said casing, said mechanical connecting means including a pair of engaging sliding members mounted for restricted rectilinear sliding movement relative each other and being connected one each to the gear mechanism and to the manual control, said engaging members being operatively engaged with the manual control member in stand-by position to effect movement of the gear mechanism by the manual control member, the engaging member connected to the gear mechanism being movable independently of the other engaging member with the manual control member in the normal stand-by position to permit shifting of the gear mechanism independently of the manual control member, and second control means connected to said connecting means for independent shifting of said gear mechanism with the manual control member disposed in the normal stand-by position.

12. A gear shifting control in a gear mechanism having an enclosing casing, which includes a manual control member journalled within the wall of said casing, a connecting means coupling the gear mechanism and said manual control member, said connecting means including a pair of telescoping members to permit shifting of the gear mechanism independently of movement of said manual control member and electromagnetic means mounted on said casing and having an armature connected to said gear mechanism for electrically shifting said gear mechanism incident to energization of said electromagnetic means.

13. In a gear mechanism adapted to be positioned in two alternate positions, a shifting mechanism adapted to alternate the position of said gear mechanism incident to successive actuation of the shifting mechanism, a pivotal member biased to a predetermined position and coupled to actuate said shifting mechanism incident to predetermined pivotal movement of the pivotal member, a casing for enclosing said shifting mechanism and piv-

UNITED STATES PATENT OFFICE
CERTIFICATE OF CORRECTION

Patent No. 2,955,479                                  October 11, 1960

William E. Steen

It is hereby certified that error appears in the printed specification of the above numbered patent requiring correction and that the said Letters Patent should read as corrected below.

Column 4, line 43, for "platae 21" read -- plate 21 --; line 65, for "57" read -- 58 --; column 7, line 60, for "the latter ears" read -- the latter gears --.

Signed and sealed this 25th day of April 1961.

(SEAL)
Attest:

ERNEST W. SWIDER                                      DAVID L. LADD
Attesting Officer                                          Commissioner of Patents